United States Patent [19]

Orii

[11] Patent Number: 4,542,480

[45] Date of Patent: Sep. 17, 1985

[54] ELECTRONIC MEMORANDA DEVICE FOR STORING, RETRIEVING, AND DISPLAYING A SCHEDULE OF DATA IN RECORDS

[75] Inventor: Toshio Orii, Suwa, Japan

[73] Assignee: Kabushiki Kaisha Suwa Seikosha, Tokyo, Japan

[21] Appl. No.: 328,347

[22] Filed: Dec. 7, 1981

[30] Foreign Application Priority Data

Dec. 9, 1980 [JP] Japan ................................ 55-173405
Dec. 10, 1980 [JP] Japan ................................ 55-174163

[51] Int. Cl.[4] ........................ G06F 17/06; G06F 15/20
[52] U.S. Cl. ........................................ 364/900; 364/410
[58] Field of Search ................ 364/200, 900, 406, 410

[56] References Cited

U.S. PATENT DOCUMENTS

| | | | |
|---|---|---|---|
| 3,406,387 | 10/1968 | Werme | 364/900 |
| 3,775,752 | 11/1973 | Lorenzo | 364/200 |
| 4,016,542 | 4/1977 | Azure | 364/900 |
| 4,125,871 | 11/1978 | Martin | 364/900 |
| 4,193,120 | 3/1980 | Yello | 364/900 |
| 4,245,311 | 1/1981 | Nakamura | 364/900 |
| 4,319,337 | 3/1982 | Sander et al. | 364/900 |
| 4,339,806 | 7/1982 | Yoshida | 364/900 |
| 4,355,361 | 10/1982 | Riggs et al. | 364/900 |
| 4,402,056 | 8/1983 | Sado et al. | 364/900 |

OTHER PUBLICATIONS

Schaum's Outline Series, *Programming with Basic Including Microcomputer Basic*, 1975, pp. 95–97.

*Primary Examiner*—Gareth D. Shaw
*Assistant Examiner*—Daniel K. Dorsey
*Attorney, Agent, or Firm*—Blum Kaplan Friedman Silberman & Beran

[57] ABSTRACT

An electronic memoranda device especially suitable for the retrieval of stored data with low energy consumption is provided. In the electronic memoranda device, days, times, and schedules, and the like, are stored in a data memory. At regular intervals a key portion of these stored times is compared with a key portion of a current time signal outputted from a timekeeping circuit. When the key portion of time data read out from the data memory coincides with the corresponding portion of the currently outputted timekeeping signal, the entire data stored in memory is scanned for coincidence with the complete timekeeping signal. Coincident data is outputted for display. When the initial survey of the memory indicates that no data is stored corresponding to the key current time unit provided by the timekeeping circuit, the inspection operation of the memory is interrupted until the occurrence of the next time unit wherein inspection of the memory is repeated.

14 Claims, 5 Drawing Figures

FIG. 1 PRIOR ART
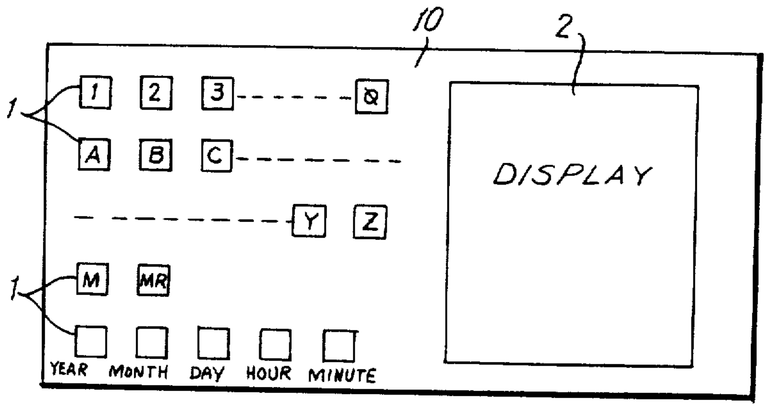
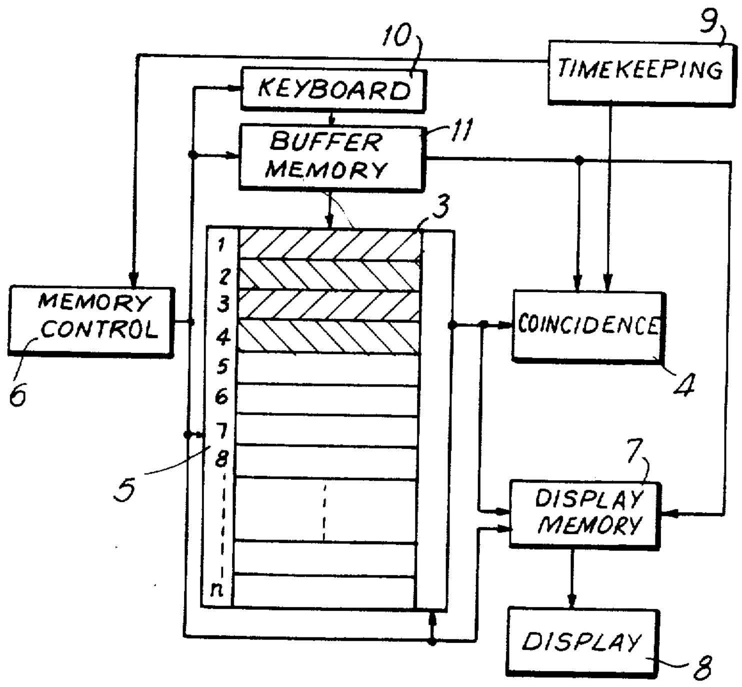
FIG. 2 PRIOR ART

ELECTRONIC MEMORANDA DEVICE FOR STORING, RETRIEVING, AND DISPLAYING A SCHEDULE OF DATA IN RECORDS

BACKGROUND OF THE INVENTION

This invention relates generally to an electronic memoranda device and more particularly, to an electronic memoranda device which is efficient in consumption of power. A conventional embodiment of an electronic memoranda device is shown in FIG. 1 for the purpose of explaining the general functions. The device includes input and control keys, and a display portion for displaying data stored in memory. Data is stored in memory in the form of records having a format, for example, as shown in Table 1. Three records are presented in the Table indicating three events which are scheduled for Jan. 24, 1980, and further indicating the nature of the event and the scheduled time.

TABLE 1

| | | |
|---|---|---|
| AM 10 : 30 | Jan. 24, 1980 | CONFERENCE |
| AM 11 : 45 | Jan. 24, 1980 | MEETING |
| PM 3 : 00 | Jan. 24, 1980 | TELEPHONE CALL |

For storing data, the operator of the memoranda device depresses keys on the face of the device corresponding to these records. Then a key M is pressed which causes the inputted data to be stored in an internal data memory as described more fully hereinafter.

As shown in FIG. 2, in the electronic memoranda device having a conventional construction, signals inputted from a keyboard are temporarily stored in a buffer memory and the contents of the buffer memory are then stored in empty addresses of the data memory. In the construction shown in FIG. 2, an address shown with cross-hatching in the data memory is assumed, for the purpose of discussion, to be occupied by pertinent data. Hence, the newly inputted contents of the buffer memory are stored in the first empty address, in sequence in the data memory. The empty addresses in the memory are shown without cross-hatching.

On the other hand, the circuit includes a timekeeping function, that is, a clock circuit, which generates data relating to minutes, hours, days, months and years. The output of the timekeeping circuit is applied to an input terminal of a coincidence circuit. Further, a carrying signal obtained from the clock circuit is applied to a data memory control circuit for controlling the data memory so as to deliver data related to minutes, hours, and other time-related parameters from the memory addresses, successively to the coincidence circuit. When coincidence is found in the circuit between the time data furnished by the clock, indicating substantially current time, and the stored data read out of the memory, the full data stored at the address of the coincident data is transferred to a display memory for display in a display circuit.

When no coincidence is found at one address of the memory the memory control circuit increments the searched address by one address so as to deliver to the coincident circuit the data from the address immediately following the data which has already been inspected. This continues until every address has been compared in the coincidence circuit.

However, in a construction where the carrying signal from the timekeeping clock is selected for occurrence one minute intervals, as in a conventional construction, the coincidence circuit operates every minute to compare the output from the data memory with the output of the clock circuit. This comparison occurs whether or not there is pertinent data to be found in the data memory corresponding to the current time as determined by the timekeeping clock. As a result of this repetitive and complete scanning of the memory, a substantial portion of the power supplied to a conventional memoranda device is wasted.

In an electronic memoranda device of the portable type, the power is supplied from a battery of small capacity. Therefore, it is preferable to avoid such wasted power as described above. However, if to save power the carrying signal is selected to occur at intervals of ten minutes, it would not be possible to store data for particular times occurring during the ten minutes between the consecutive carrying signals and a compromise of as much as five minutes would be necessary in entering certain data. Also in a conventional electronic memoranda device data is randomly input increasing the amount of searching in memory required when reading out data for a particular time.

What is needed is an electronic memoranda device which stores data and retrieves the stored data without waste of electrical energy.

SUMMARY OF THE INVENTION

Generally speaking, in accordance with the invention, an electronic memoranda device especially suitable for the retrieval of stored data with low energy consumption is provided. In the electronic memoranda device, times, and schedules, and the like, are stored in a data memory. At regular intervals a key portion of these stored times is compared with a key portion of a current time signal outputted from a timekeeping circuit. When the key portion of time data read out from the data memory coincides with the corresponding portion of the currently outputted timekeeping signal, the entire data stored in memory is scanned for coincidence with the complete timekeeping signal. Coincident data is outputted for display. When the initial survey of the memory indicates that no data is stored corresponding to the key current time unit provided by the timekeeping circuit, the inspection operation of the memory is interrupted until the occurrence of the next time unit wherein inspection of the memory is repeated.

In an alternative embodiment of an electronic memoranda device in accordance with the invention the data is stored in memory in a chronological sequence such that it is unnecessary to inspect the entire memory content at each selected time interval. Thus, energy is conserved. Retrieval of data on demand is also provided with reduced energy consumption.

Accordingly, it is an object of this invention to provide an improved electronic memoranda device and method which output the required data with low energy consumption.

Another object of this invention is to provide an improved electronic memoranda device and method which automatically output pertinent memoranda data substantially coincident with the schedule time.

Still another object of this invention is to provide an improved electronic memoranda device and method which output stored memoranda on demand.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a simplified drawing of the face of a conventional electronic memoranda device;

FIG. 2 is a functional circuit diagram of the electronic memoranda device of FIG. 1.

DESCRIPTION OF THE PREFERRED EMBODIMENTS

Figure 3:
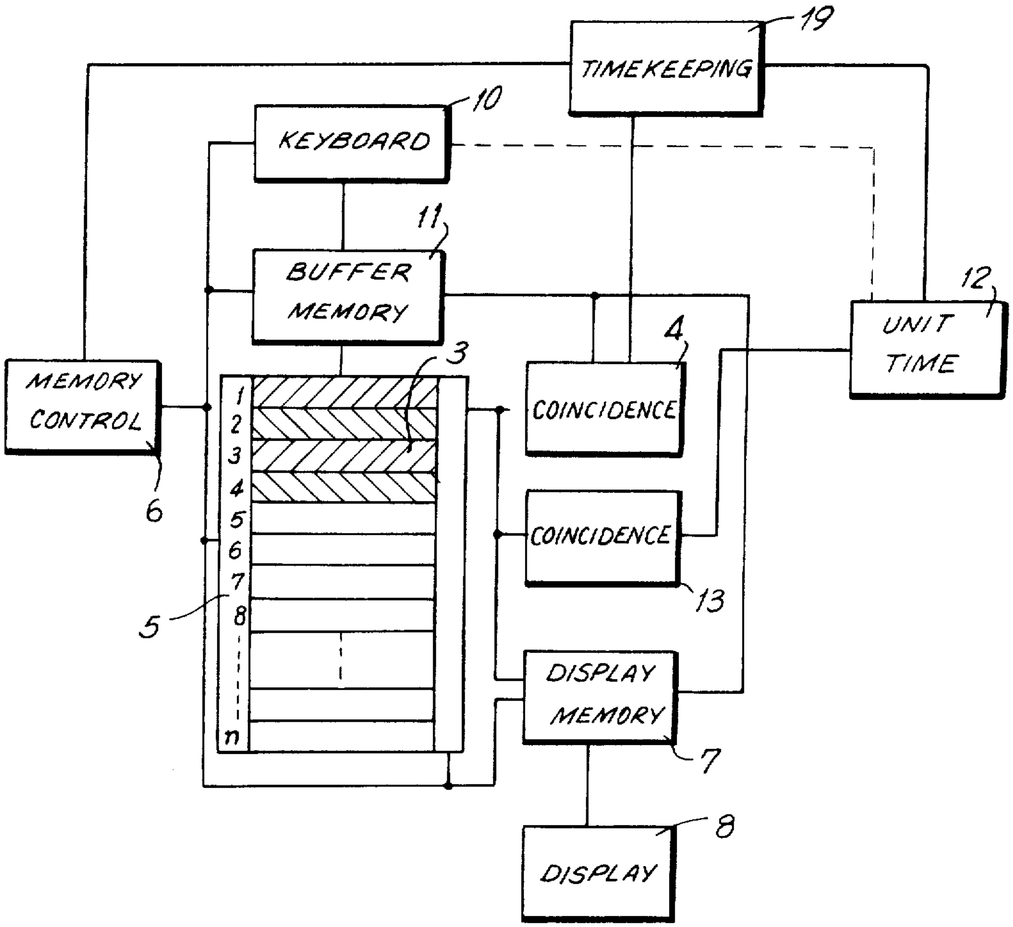
FIG. 3 is a functional diagram of an electronic memoranda device in accordance with the invention.

A conventional electronic memoranda device, as shown in FIG. 1, is explained to describe the general functions of such a memoranda device. The device of FIG. 1 includes input and control keys 1, and a display 2 for displaying selectively the contents stored within the memoranda device. The data is stored within the memoranda device in a format of a record, for example, as shown in Table 1. The operator of the memoranda device depresses keys 1 corresponding to each character of these record when it is desired to input such data to the memory for later retrieval. After the operator has keyed this data, the key M is pressed instructing the internal circuits to store the record in the data memory.

The memoranda device (FIG. 1) of conventional construction comprises a circuit as shown in FIG. 2. In this circuit, signal supplied from the keyboard 10 are temporarily stored in a buffer memory 11. The contents of the buffer memory 11 are then stored in an empty address 5 of a data memory 3. In FIG. 2, the cross-hatched portions of the data memory addresses 5 are assumed to be holding pertinent data, in particular, addresses 1–4 contain data while addresses 5 - - - n contain no data. Hence, the newly inputted contents of the buffer memory 11 are stored in address No. 5 of the data memory 3 in this example.

A clock or timekeeping circuit 9 generates data relating to the present minute, hour, day, month and year. The internal construction of the circuits 9 is similar to those of an electronic timepiece providing similar timekeeping data. An output of the timekeeping circuit 9 is supplied to an input terminal of a coincidence circuit 4, and also a carrying signal from the timekeeping circuit 9 is applied to a data memory control circuit 6. The data memory control 6 controls the data memory 3 so as to deliver successively to the coincidence circuit 4 selected data related to minutes, hours, and other parameters. When coincidence occurs in the coincidence circuit 4 between the timekeeping data and the data from a memory address of the memory 3, the entire data located in the address which provides the coincident information is transferred to a display memory 7 for display by a display unit 8.

When no coincidence is found at a selected memory address, the memory control circuit 6 increments the address by one so as to search the next address and to deliver data to the coincidence circuit 4 from the immediately following address. However, in a construction where the carrying signal is selected to occur every minute, as in the presented example, the coincidence circuit 4 operates every one minute to compare the output from the data memory 3 with the output of the clock circuit 9 whether or not there is any coincident data in the data memory 3. As a result, a large portion of the power supplied to the conventional memoranda device is wasted.

In an electronic memoranda device of a portable type, the power is supplied from a battery of small capacity. Therefore, it is preferable to avoid such waste of power. However, if to save energy the carrying signal is selected to occur at ten minute intervals, it would not be possible to store data for all times occurring between the consecutive carrying signals, and a compromise of as much as five minutes would be necessary in entering intermediate data.

The electronic memoranda device in accordance with this invention overcomes the difficulty of high power consumption of the conventional memoranda device, and is now described in detail with reference to FIG. 3 wherein members and parts which are similar to the parts of the device of FIGS. 1 and 2 are identified with similar reference numerals.

In the electronic memoranda device of FIG. 3, a clock or timekeeping circuit 19 delivers a carrying signal to a unit-time circuit 12 for every unit of time, for instance, ten minutes or one hour. For the purpose of illustrating the concepts, assume that the unit time is selected to be one hour, and a carrying signal of one hour duration is applied to the unit of time circuit 12. The unit-time circuit 12 outputs a signal indicative of the actual hour, assumed to be AH to a second coincidence circuit 13.

Responding to the operation of the memory control circuit 6, which as described above is actuated by the carry signal from the timekeeping circuit 19, the hours data in the stored data in the consecutive addresses of the memory 3 are outputted to the second coincidence circuit 13 sequentially to be compared with the actual hour AH. When coincidence is found, another carrying signal of one minute duration is delivered from the timekeeping circuit 19 to a first coincidence circuit 4 which receives time data in full detail related to the coincident hour from the data memory 3. Comparisons are carried out in the first coincidence circuit 4 as described with reference to the construction of FIG. 2, and full data from the memory 3 which is completely coincident with respect to time, and includes the appointment data, is outputted to the display memory 7 and displayed by the display circuit 8.

Conversely, when no initial coincidence is found in the coincidence circuit 13, that is, when no hour exists in the data memory 3 corresponding with the present hour AH, operation of the coincidence circuits 4, 13 and other circuits is stopped until a carrying signal for the next hour is delivered from the timekeeping circuit 19. In this manner, comparisons are eliminated when no scheduled event occurs within a period beginning on the hour through the 59th minute of the selected hour. Thus, considerable power is saved.

Further, storage of data in terms of minutes is made possible by the present construction and the difficulties of the conventional memoranda device described above can be eliminated.

Again, referring to FIGS. 1 and 2 and to Table 1, it should be noted that the order of storing the schedule items, that is, the records, is not necessarily in accordance with the time sequence of the scheduled events. As might be expected, the order of storing these records is at random. If the memory 3 was organized such that the addresses 1–n were assigned in advance with an address reserved in sequence for every day, month, hour and minute, then every input record could go to a memory address which has been reserved to receive such data. When the memory addresses have been arranged in a chronological order, and the memory addresses are scanned successively, as described above, then, in conjunction with a coincidence circuit, the correct sequential order of the stored data would be retrievable for display in that order. Such a procedure, however, requires a very large data memory so as to have all possible schedule times associated with a preassigned memory address. Hence, such a concept is not economical for inputting data at random which later will be read out in chronological order.

Figure 4:
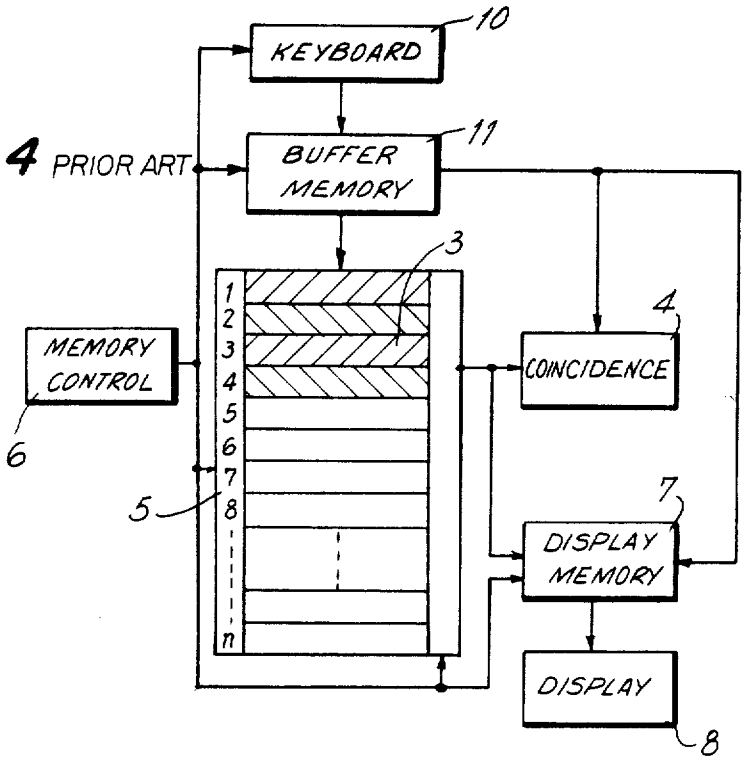
FIG. 4 PRIOR ART
FIG. 4 is a functional diagram of another electronic memoranda device of conventional design.

The construction of FIG. 4 is similar to the construction of FIG. 2. However, records are not automatically called up for display in the construction of FIG. 4 as records are called up automatically by the timekeeping unit in FIGS. 2 and 3. In the electronic memoranda device of FIG. 4, data is called up by the operator.

In the conventional design (FIG. 4), when a schedule item is to be called up and displayed, for example, 1980 01 24, these character keys 1 are pressed on the keyboard. Then, the key identified as MR (FIG. 1) is pressed. This causes the data from the keyboard 10 to enter the coincidence circuit 4 by way of the buffer memory 11. Then, as described above with respect to FIG. 2, the data memory control 6 successively scans each address in the memory 3 from the lower most address to the upper most address. When a coincidence is detected, the full data stored in the address is sent to the display memory 7 and displayed by the display circuit 8. More specifically, the coincidence circuit 4 discriminates for coincidence of the data in all addresses in the data memory 3 successively with the data stored in the buffer memory 11. Such an operation substantially reduces the operational life of a small sized battery which is desirably used as a feature in the design of a small size portable electronic memoranda device.

Thus, the conventional design of FIG. 4 has a disadvantage in that the data is not available for read out in chronological order without a very large size memory, and read out consumes excessive power through the necessity to scan every memory address each time a request is made to display a schedule item.

Figure 5:
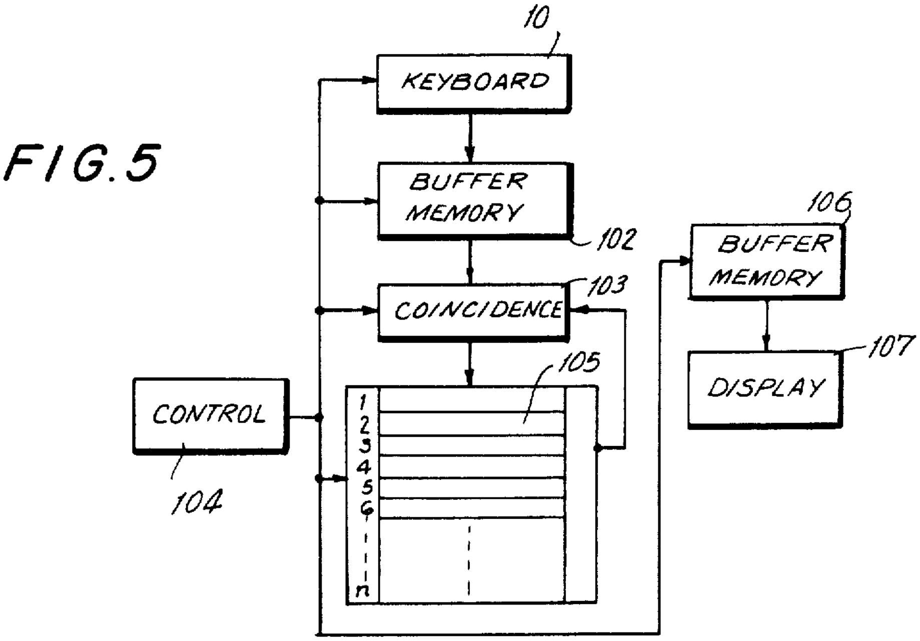
FIG. 5 is an alternative embodiment of an electronic memoranda device in accordance with this invention.

The alternative embodiment of an electronic memoranda device in accordance with this invention, which is constructed to overcome the difficulties of the conventional memoranda device, is illustrated in FIG. 5. In the electronic memoranda device in accordance with the invention, data is stored advantageously and the required number of coincidence operations for read out is substantially reduced. In accordance with the invention, time data, down to the minute, within the records (Table 1) are utilized as the statement numbers ordinarily used in numerical operations. When storing a record, it is stored in a position in the memory such that the larger statement numbers, that is, those representing later events are stored in the lower addresses.

When the above described arrangement of the storage positions, a schedule can be called up by simply carrying out coincidence operations from the lowest (earliest) position toward the highest (latest) positions sequentially in the memory, and by interrupting the coincidence checking operation when a non-coincidence is detected following coincidence. In this manner, the necessity of carrying out the coincidence operation for the entire number of addresses in the data memory can be avoided. Hence, the time required for the coincidence operations is substantially reduced.

With reference to FIG. 5, for the operation of storing a record, that is, year, month, day, hour, minute and schedule item, keys 1 of a keyboard 10 are pressed corresponding to the characters and the data is stored in a buffer memory 102. Upon depression of the keys M (FIG. 1), the various fields making up the time data, that is, year, month, day, hour, and minute from the contents of the buffer memory 102 are sent to a coincidence circuit 103.

Also, a control circuit 104, upon pressing of the key M causes the memory 105 to output the time data stored in the memory addresses to the coincidence circuit 103. The memory addresses are read out sequentially starting from the lowest address. The coincidence circuit 103 compares the time data obtained from the data memory 105 with the time data obtained from the buffer memory 102. When the time data obtained from the buffer memory 102 is found to be larger than the time data obtained from the data memory 105, the coincidence circuit 103 instructs the control circuit 104 to deliver the time data from the next higher address than the address of the time data which has already been delivered for comparison.

On the other hand, when the time data obtained from the buffer memory 102 is found to be smaller than the time data obtained from the data memory 105, the coincidence circuit 103 instructs the control 104 to shift the data having addresses higher than that of the time data now being compared. The data having higher addresses is shifted by an amount corresponding to the number of fields in a record which is required to be stored in the data memory 5. After sufficient memory positions, corresponding to the data which is to be inputted, have been cleared of earlier data, the record stored in the buffer memory 102 is transferred into the data memory 105 into the newly cleared memory address or addresses.

It should be understood that this procedure is followed in inputting every record. Therefore, all the earlier data in memory, when a new input is made, is already chronologically arranged.

The operation for calling out schedule items is performed as follows. The time data of the desired items, for instance, year, month, and day is pressed on the keyboard 10 and temporarily stored in the buffer memory 102 by pressing the key M. Then, the key MR is pressed. Upon depression of the key MR, the contents of the buffer memory 102 are entered into the coincidence circuit 103. Further, pressing of the key MR activates the control circuit 104 so as to deliver time data (year, month, and day) corresponding to data which has been input on the keyboard for call-out.

Data is read out sequentially starting from the lowest (earliest) address of the data memory 105, and the data outputted from the memory 105 is inputted to the coincidence circuit 103. The coincidence circuit 103 compares the time data read out of the memory 105 with the time data obtained from the buffer memory 102. When the two sets of time data are found to be equal, the entire record stored in the address of the data memory 105 which caused coincidence in the time data coincidence circuit 103 is outputted to a buffer memory 106 and displayed in a display circuit 107. Sequential address data read out continues until the two sets of time data are no longer equal to each other. That is, when the time data from the data memory 105 is found to be larger (later) than that of the data in the buffer memory 102, the comparing operation in the coincidence circuit 103 is interrupted.

With the above described procedures, although the time required for storing a record is somewhat longer than in an electronic memoranda device of a conventional design (FIG. 4), the time required for memory scanning and calling up a schedule item is substantially reduced. Since the frequency of calling out of the schedule data is ordinarily much higher than the frequency of storing records, the entire operational time of the electronic memoranda device can generally be reduced. Thus, power consumption is reduced and this is a very important feature for a portable type electronic memoranda device.

It should be readily apparent to those skilled in the art that the circuits can be adapted to recognize that a PM symbol represents a time later than an AM symbol for the purposes of inputting and displaying the data in memory in chronological order. Further, in both embodiments, it should be understood that the use of AM and PM can be eliminated in favor of identifying the hours as 1 through 24, rather than repeating 1 through 12 concurrent with the use of the AM/PM symbols.

It should also be understood that in an alternative embodiment of an electronic memoranda device in accordance with the invention, the features of the embodiments of FIGS. 3 and 5 can be combined. In such an alternative embodiment both automatic display would be provided as described in relation to FIG. 3 controlled by a timekeeping circuit and also particular information, fðr any desired date could also be called up on demand of the operator by operation of the keys in a manner similar to that disclosed with reference to FIG. 5. The broken lines between the keyboard 10 and unit time circuit 12 indicates such an embodiment wherein a keyboard inquiry initiates the searches, possibly using both coincidence circuits 13,4.

It will be understood by those skilled in the art that many different types of memories may be employed in an electronic memoranda device in accordance with the invention for providing read in and read out of data in the records having various fields as discussed above. In storing inputted data in chronological order even when the data is inputted in a random manner chronologically, it will be apparent that interleaving of data is accomplished at the desired memory address by moving all data stored at higher memory addresses to the next highest address, or addreses where more than one address is required to store a record. This is readily accomplished by shifting the data from the highest used address into a buffer memory and then inputting the data in the buffer memory into the next higher address. This clears an address and data is shifted to higher addresses sequentially until the proper address is opened for interleaving of the new data.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic memoranda device for storing and displaying a schedule of data in records, each of said records including a time data field and an associated event data field, comprising:

memory means for storing said records, said memory means comprising a plurality of memory addresses;

display means for selectively displaying data read from the memory means;

inquiry means for generating a time related inquiry signal, said inquiry signal comprising time data;

first coincidence circuit means coupled to the memory means and inquiry means for comparing a part of the time data field in one record with a part of the inquiry signal, said first coincidence circuit means generating a first output when coincidence is found between the part of the time data field and the part of the inquiry signal;

second coincidence circuit means coupled to the memory means, display means, inquiry means and first coincidence circuit means for comparing the entire time data field in one record with the entire inquiry signal when the first output is received from the first coincidence circuit means, and second coincidence circuit means causing the display means to display said one record when coincidence is found between the time data and the inquiry signal; field and control means for repetitively selecting said time data fields from the memory means for comparison by said first coincidence circuit means upon receipt of said inquiry signal.

2. An electronic memoranda device as claimed in claim 1 wherein said inquiry means is a time keeping circuit.

3. An electronic memoranda device as claimed in claim 1, wherein said inquiry means comprises a keyboard in circuit with said memory means for keying in said inquiry time data.

4. An electronic memoranda device as claimed in claim 1, further comprising a manual keyboard and buffer memory means, said buffer memory means coupled to the control means and memory means and the keyboard coupled to the buffer memory means, said buffer memory means holding records manually inputted from said keyboard, said records comprising a time data field and an associated event field, said control means being adapted to transfer said manually inputted records from said buffer memory means into said memory means.

5. An electronic memoranda device as claimed in claim 1, wherein said manually input records are stored in said memory means so as to maintain the ordered sequence of the records.

6. The electronic memoranda device of claim 1, wherein the records are stored in the memory means in an order.

7. The electronic memoranda device as claimed in claim 6 further comprising a manual keyboard and buffer memory means, said buffer memory means coupled to the control means and memory means and the keyboard coupled to the buffer memory means, said buffer memory means holding records manually inputted from said keyboard, said records comprising a time data field and an associated event field, said control means being adapted to transfer said manually inputted records from said buffer memory means into said memory means.

8. The electronic memoranda device of claim 5, wherein said control means locates correct memory addresses in the memory means for the manually input record to maintain the ordered sequence of the records in the memory means.

9. The electronic memoranda device of claim 6 wherein the control means shifts the records in memory addresses after the correct memory address for the manually input record so that the manually input record may be input into the correct memory addresses.

10. The electronic memoranda device of claim 6, wherein the inquiry means is a manually entered signal which has a time data field and a periodic time field; whereby the entry of a manually entered signal causes the records with time data fields starting from the time of the manaully entered signal time data field and terminating with the time of the manually entered signal time data field plus the manually entered periodic time to be displayed by the display means.

11. The electronic memoranda device of claim 1, wherein the parts of the time data field and inquiry field include at least the hour.

12. The electronic memoranda device of claim 10 wherein the inquiry means generates an inquiry signal every minute for one hour after the first coincidence circuit means generates the first output.

13. The electronic memoranda device of claim 1 wherein the records are stored in the memory means in a chronological sequence.

14. The electronic memoranda device of claim 13, wherein the control means stops selecting time data when the part of the time data is later than the part of the inquiry signal.

* * * * *